Aug. 11, 1953   M. SULLIVAN   2,648,150
LICENSE TAG HOLDER
Filed Jan. 8, 1952   2 Sheets-Sheet 1
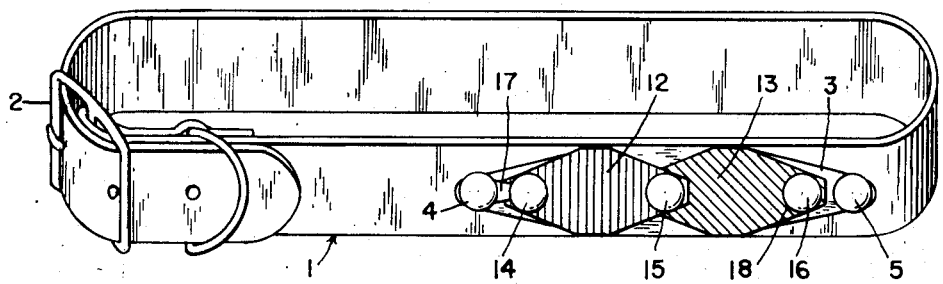
FIG. 1.
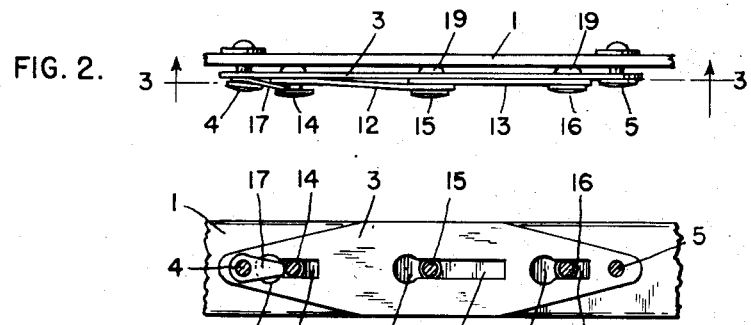
FIG. 2.
FIG. 4.
FIG. 3.
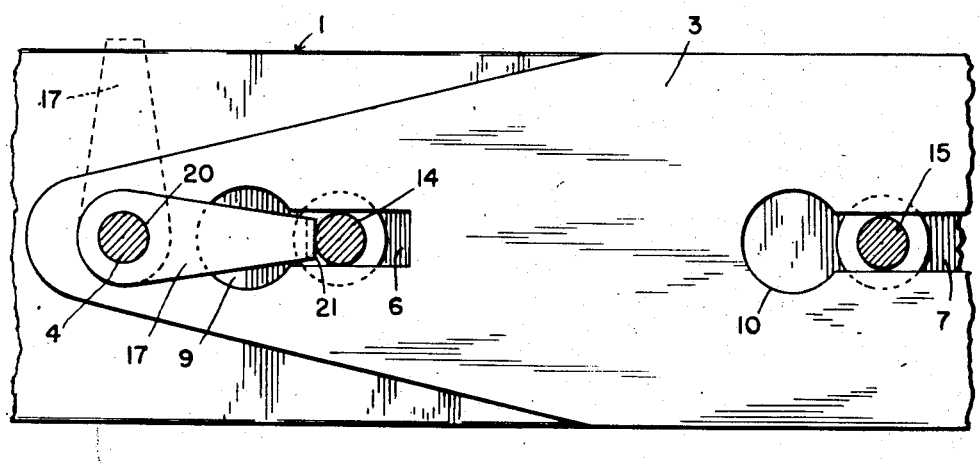
FIG. 5.
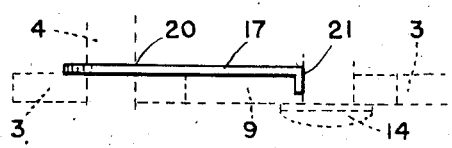
FIG. 6.
INVENTOR
MICHAEL SULLIVAN
BY *Mason, Mason & Sheridan*
ATTORNEYS Aug. 11, 1953  M. SULLIVAN  2,648,150
LICENSE TAG HOLDER
Filed Jan. 8, 1952  2 Sheets-Sheet 2
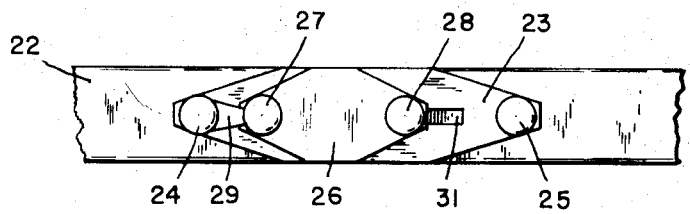
FIG. 7.
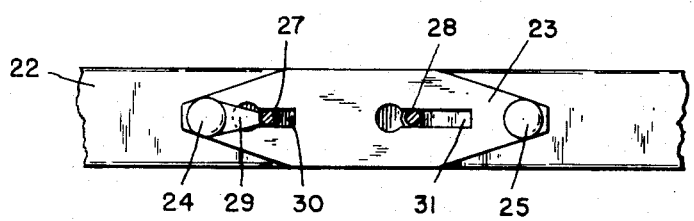
FIG. 8.
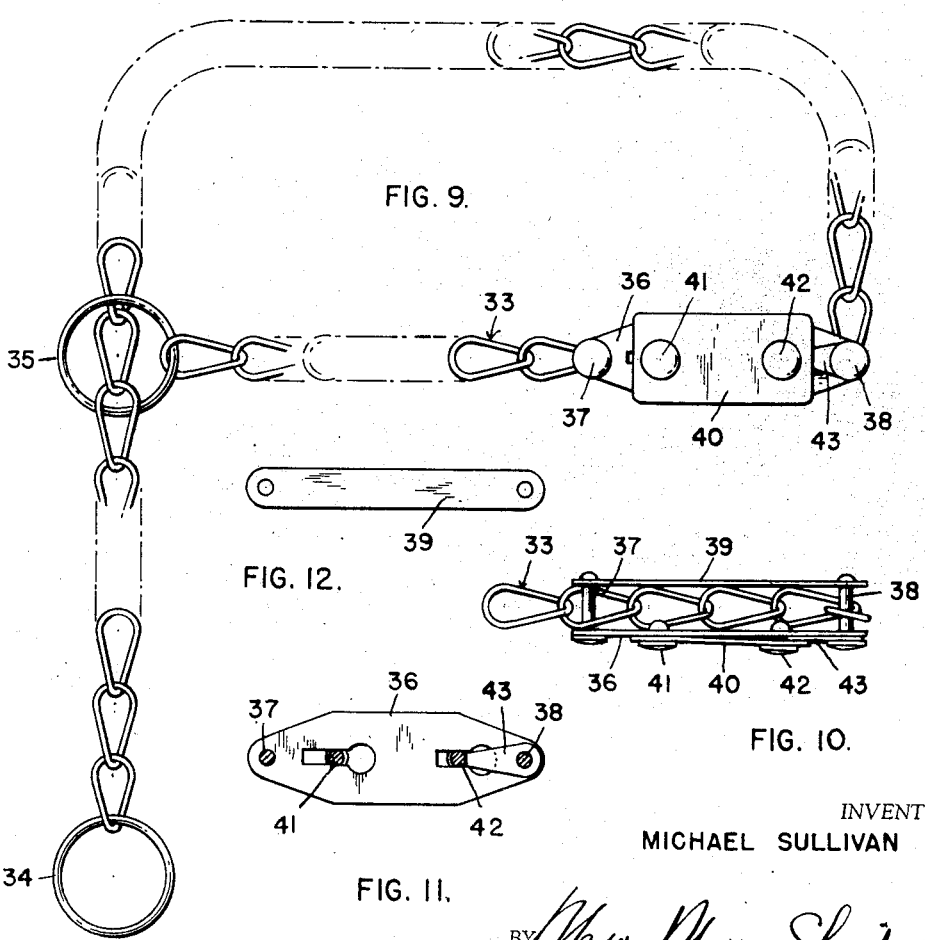
INVENTOR
MICHAEL SULLIVAN
BY
ATTORNEYS Patented Aug. 11, 1953

2,648,150

UNITED STATES PATENT OFFICE 2,648,150

LICENSE TAG HOLDER

Michael Sullivan, Youngstown, Ohio

Application January 8, 1952, Serial No. 265,506

8 Claims. (Cl. 40—10)

This invention relates to a license tag holder for detachably supporting one or a plurality of tags on a single support, all mounted on a collar or harness for domesticated animals such as dogs or cats.

A principal object of the invention therefore is to provide a tag holder for removable supporting tags whereby the tags may be removed and new ones substituted without injury to the collar or harness.

Another object is to provide a license tag of special construction for cooperation with a support.

A further object is to provide a tag holder which is adapted for permanent attachment to a collar or harness whereby a minimum of holes are required in the collar or harness, hereinafter called collar.

An additional object is to provide a support and tag with means for mounting the support on a chain collar, either of the usual type or a choke chain collar.

Yet another object is to provide a tag support permanently mounted on a collar in combination with means for removably supporting one or more tags on said support, which tags may be of plastic material and of different colors, in order to readily identify the tags concerning the State from which issued, year of issuance, whether a license or rabies tag, etc.

Other objects will appear hereinafter throughout the specification.

In the drawings:

Figure 1 is a front elevation of a collar having mounted thereon one form of tag support and tags mounted thereon.

Figure 2 is a top plan view of the structure of Figure 1 with portions of the collar broken away.

Figure 3 is a front elevation of the structure of Figure 2 with the tags removed.

Figure 4 is an elevational view of one of the tag rivets.

Figure 5 is an enlarged front elevational view of the collar and tag support partly broken away and with the tag rivets in section.

Figure 6 is a side elevation of the lock spring.

Figure 7 is a front elevational view with portions of the collar broken away of a second form of the invention.

Figure 8 is a view similar to Figure 7 but with the tag removed and the tag rivets shown in section.

Figure 9 is a front elevational view of a third form of the invention,

Figure 10 is a fragmentary top plan view of the structure shown in Figure 9.

Figure 11 is a front elevation with parts shown in section of the tag supporting plate, rivets and lock spring, and Figure 12 is a front elevation of the backing plate.

The invention shown in Figures 1 to 6 inclusive includes a collar 1 of ordinary construction, composed principally of leather or similar material having the usual metal buckle 2. In place of a collar any suitable type of harness may be used.

The tag support consists of a plate 3 of suitable shape and of a material such as metal. The plate is preferably permanently affixed to the collar by plate rivets 4 and 5 located at either end of the tag support.

In some States the statutes require not only a yearly license tag but also a rabies tag which latter also covers a definite period of time. The removal and replacement from time to time of these tags, due to the fact that they have heretofore been riveted through the collar each time, caused a weakening of the collar. When a split rivet was used to hold the tag on the collar, the turned over tongs would catch the hairs of the animal, such as a dog, thus making the animal afraid of the collar.

The provision of a tag supporting plate and means for removably supporting the tags on the plate completely overcome these deficiencies.

In the construction shown the tag supporting plate 3 is provided with a plurality of key hole slots 6, 7 and 8 here shown to be three in number. These slots have enlargements 9, 10 and 11 respectively which lie in the same direction, i. e., they are located near the same end of the collar. The slot 6 is located in close proximity to rivet 4 for a reason to be explained hereinafter.

When 3 key hole slots are provided, two tags 12 and 13 are supported thereby. Should it be desired to support three tags instead of two tags, four key hole slots are provided on the plate 3 in place of the three slots shown. Four tags would require five slots, etc. The tags may be composed of any suitable material, but I prefer to use plastic material because such material lends itself to the manufacture of tags of different colors, and a different colored tag may be issued each year or other period of time, very much in the manner of issuing differently colored automobile tags each year and for the same reason, i. e., to readily identify the year of the tag from a distance. Additionally, the present invention contemplates using differently colored tags to designate, for instance, the yearly license and the rabies license. As shown in Figure 1, there is a red tag 12 and a green tag 13. The red tag may be proper for a 1952 license and the green tag the rabies license. For the year 1953, a blue tag may be issued which will replace the red tag 12. Similarly the green tag 13 may require replacement from time to time in accordance with State or local laws, and such new tag will be of a different color to indicate, from a distance, compliance with the laws pertaining to rabies examination and treatment or for other purposes.

The tags are held to each other and non-removably fixed on the tag supporting plate by the tag rivets 14, 15 and 16, and by the lock spring 17.

As seen in Figure 4, each tag rivet is in the shape of a collar button and has an enlarged head 18 and a smaller head 19. Each of the tags is provided with openings near each end thereof which openings are about the size of the smaller head 19 so as to permit the head to pass therethrough. When using tags of thin plastic material, the openings may be slightly smaller than the head 19 so that the head may be snapped through the openings.

The lock spring 17 has an opening 20 of a size to surround plate rivet 4 and allow pivotal movement of the lock spring about this rivet. The opposite end of the lock spring has a nose 21 as best seen in Figure 6.

As will be noted by reference to Figures 1 to 3 and 5, the adjacent ends of a pair of tags are held to each other by the tag rivet 15, and all three rivets 14, 15 and 16, after being forced into the key hole slot enlargements 9, 10 and 11 respectively, are then forced into the narrow slot portions of the key hole slots.

All three tag rivets are held in this position because of the connections of the tags when the lock spring 17 has been rotated from the dotted line to the full line position of Figure 5. In this position, due to the resiliency of the spring lock, the nose 21 thereof has been snapped into the key hole slot 6 with the nose in abutting position with the cylindrical portion of tag rivet 14. In order to remove the tags from the holder or plate 3, it is necessary to slide a knife, file, ice pick or other tool beneath the lock spring and force the nose 21 out of the slot 6, after which the lock spring may be rotated to its dotted line position. The tags and tag rivets are then forced to the left as seen in Figures 1 and 3 until the smaller heads of the tag rivets are in alignment with the key hole slot enlargements 9, 10 and 11, whereupon the tags and tag rivets as a whole may be detached from the tag supporting plate. It is then an easy matter to detach the tags from each other.

In the two other forms shown in Figures 7 to 10 the tag supporting plates, tag rivets, lock springs and tags may be identical or substantially so, to the form shown in Figures 1 to 6.

In the form shown by Figures 7 and 8, provision is made for supporting only a single tag. The collar is shown at 22, the tag supporting plate at 23, the plate rivets at 24 and 25, the tag at 26, tag rivets at 27 and 28, locking spring at 29 and the key hole slots at 30 and 31.

When leather is used as the material of the collar preferably one of the holes in the collar for rivet 4 or 5 in Figure 1, or rivet 24 or 25 in Figure 7, is a round hole while the other is a slot in order to allow for stretching of the leather collar.

In Figures 9 and 10, the construction has been adapted to a chain collar sometimes referred to as a "choke" collar. The collar as a whole is shown at 33, the ends of which are provided with rings 34 and 35. Substantially removed from the ring 35 is the tag supporting plate 36. This plate has openings adjacent each end through which extend elongated plate rivets, which latter extend through the links of the chain as seen in Figure 10 and through openings adjacent each end of the backing plate 39. The tag 40 is held on the tag supporting plate 36 by rivets 41 and 42.

The construction of the tag rivets 41 and 42, tag supporting plate with its slots is the same as that shown in the figures showing the other two forms. In this form the numerals 37 and 38 indicate rivets similar to rivets 4 and 5 of Figure 1, and 43 shows a lock spring similar to that shown in Figures 3, 5 and 6. The tag supporting plate of Figures 9 and 10 may optionally have two, three or more key hole slots in accordance with the number of tags to be supported, and the tags may be of suitable material such as metal. Preferably they are of plastic material.

It is of particular importance to provide a tag supporting unit as seen in Figure 10 of such size that the unit and part of the chain may be threaded through ring 35, so that the parts may assume the position shown in Figure 9, or the parts may be straightened to assume a single length of chain, without the loop or collar shown in Figure 9.

It is believed that the invention and numerous of its attendant advantages will be understood from the foregoing description, and it is obvious that numerous changes may be made in the construction and arrangement of the several parts without departing from the spirit and scope of the invention, or sacrificing any of its attendant advantages, the forms heretofore described being preferred embodiments for the purpose of illustrating my invention.

The term collar in the claims includes a harness or similar constructions. The lock spring 17 which is used in all of the forms of the invention may be constructed of metal such as steel, or of plastic material.

I claim:

1. A tag mounting means for a flexible member such as for dog and cat collars, comprising a rigid tag supporting plate, means mounting said tag supporting plate on said flexible member, tag means and means for removably mounting said tag means on said tag supporting plate, said means for removably mounting said tag means on said tag supporting plate comprising a plurality of key hole slots having enlargements, said slots extending through said rigid tag supporting plate and a plurality of tag rivets extending through the tag means and engaging in said key hole slots, the spacing of said tag rivets being the same distance as the distance between said enlargements of said key hole slots.

2. A tag mounting means for a flexible member such as for dog and cat collars, comprising a rigid tag supporting plate, means mounting said tag supporting plate on said flexible member, tag means and means for removably mounting said tag means on said tag supporting plate, said tag means comprising a plurality of tags, said means for removably mounting said tag means on said tag supporting plate comprising a plurality of key hole slots having enlargements, said slots extending through said rigid tag supporting plate and a plurality of tag rivets extending through the tag means and engaging in said key hole slots, the spacing of said tag rivets being the same distance as the distance between said enlargements of said key hole slots.

3. A tag mounting means for a flexible member such as for dog and cat collars, comprising a rigid tag supporting plate, means mounting said tag supporting plate on said flexible member, tag means and means for removably mounting said tag means on said tag supporting plate, said means for removably mounting said tag means on said tag supporting plate comprising a plurality of key hole slots having enlargements, said slots extending through said rigid tag supporting plate and a plurality of tag rivets extending through the tag means and engaging in said key hole slots, said means mounting said plate on said flexible member including a plurality of plate rivets extending through said plate and flexible member, and a locking spring pivotally mounted on one of said plate rivets and having a nose adapted to prevent movement of said tag means, the spacing of said tag rivets being the same distance as the distance between said enlargements of said key hole slots.

4. A tag mounting means for a flexible member such as for dog and cat collars, comprising a rigid tag supporting plate, means mounting said tag supporting plate on said flexible member, tag means and means for removably mounting said tag means on said tag supporting plate, said tag means comprising a plurality of tags, said means for removably mounting said tag means on said tag supporting plate comprising a plurality of key hole slots having enlargements, said slots extending through said rigid tag supporting plate and a plurality of tag rivets extending through the tag means and engaging in said key hole slots, said means mounting said plate on said flexible member including a plurality of plate rivets extending through said plate and flexible member, and a locking spring pivotally mounted on one of said plate rivets and having a nose adapted to prevent movement of said tag means, the spacing of said tag rivets being the same distance as the distance between said enlargements of said key hole slots.

5. A tag mounting means for a flexible member such as for dog and cat collars, comprising a rigid tag supporting plate, means mounting said tag supporting plate on said flexible member, tag means and means for removably mounting said tag means on said tag supporting plate, said tag means comprising a plurality of tags, said means for removably mounting said tag means on said tag supporting plate comprising a plurality of key hole slots having enlargements, said slots extending through said rigid tag supporting plate and a plurality of tag rivets extending through the tag means and engaging in said key hole slots, said means mounting said plate on said flexible member including a plurality of plate rivets extending through said plate and flexible member, and a locking spring pivotally mounted on one of said plate rivets and having a nose adapted to be snapped into one of said key hole slots in abutting relation with one of said tag rivets whereby to prevent removal of said tag means, the spacing of said tag rivets being the same distance as the distance between said enlargements of said key hole slots.

6. A tag mounting means for a flexible member such as for dog and cat collars, comprising a rigid tag supporting plate, means mounting said tag supporting plate on said flexible member, tag means and means for removably mounting said tag means on said tag supporting plate, said tag means comprising a plurality of tags, said means for removably mounting said tag means on said tag supporting plate comprising a plurality of key slots having enlargements, said slots extending through said rigid tag supporting plate and a plurality of tag rivets extending through the tag means and engaging in said key slots, said means mounting said plate on said flexible member including a plurality of plate rivets extending through said plate and flexible member, and a locking spring pivotally mounted on one of said plate rivets and having a nose adapted to be snapped into one of said key hole slots in abutting relation with one of said tag rivets whereby to prevent removal of said tag means, said flexible member comprising a chain, a backing plate for said tag supporting plate located on the opposite side of said chain from said tag supporting plate, said plate rivets also engaging said backing plate, the spacing of said tag rivets being the same distance as the distance between said enlargements of said key hole slots.

7. A tag mounting means for a flexible member such as for dog and cat collars, comprising a rigid tag supporting plate, means mounting said tag supporting plate on said flexible member, tag means and means for removably mounting said tag means on said tag supporting plate, said tag means comprising a plurality of tags, said means for removably mounting said tag means on said tag supporting plate comprising a plurality of key hole slots having enlargements, said slots extending through said rigid tag supporting plate and a plurality of tag rivets extending through the tag means and engaging in said key hole slots, said means mounting said plate on said flexible member including a plurality of plate rivets extending through said plate and flexible member, and a locking spring pivotally mounted on one of said plate rivets and having a nose adapted to be snapped into one of said key hole slots in abutting relation with one of said tag rivets whereby to prevent removal of said tag means.

8. A collar comprising a flexible member, a rigid tag supporting plate, means mounting said tag supporting plate on said flexible member, tag means and means for removably mounting said tag means on said tag supporting plate, said means for removably mounting said tag means on said tag supporting plate comprising a plurality of slots in said plate and a plurality of tag rivets extending through the tag means and engaging in said slots, said slots having ends, one of said ends being larger than the other end of each slot, and means for retaining one of said tag rivets adjacent the smaller end of one of said slots.

MICHAEL SULLIVAN.

References Cited in the file of this patent

UNITED STATES PATENTS

| Number | Name | Date |
|---|---|---|
| 424,197 | Harrison | Mar. 25, 1890 |
| 1,262,447 | Carr | Apr. 9, 1918 |
| 1,539,744 | Kelly | Mar. 26, 1925 |
| 2,097,070 | Largo | Oct. 26, 1937 |

FOREIGN PATENTS

| Number | Country | Date |
|---|---|---|
| 177,878 | Switzerland | July 30, 1935 |